United States Patent
Yokonuma

(10) Patent No.: US 7,492,392 B2
(45) Date of Patent: Feb. 17, 2009

(54) ELECTRONIC CAMERA AND IMAGE PROCESSING PROGRAM

(75) Inventor: Norikazu Yokonuma, Adachi-ku (JP)

(73) Assignee: Nikon Corporation, Tokyo (JP)

( * ) Notice: Subject to any disclaimer, the term of this patent is extended or adjusted under 35 U.S.C. 154(b) by 338 days.

(21) Appl. No.: 10/515,376

(22) PCT Filed: May 27, 2003

(86) PCT No.: PCT/JP03/06600

§ 371 (c)(1),
(2), (4) Date: Nov. 23, 2004

(87) PCT Pub. No.: WO03/101091

PCT Pub. Date: Dec. 4, 2003

(65) Prior Publication Data

US 2005/0243180 A1    Nov. 3, 2005

(30) Foreign Application Priority Data

May 27, 2002    (JP)    ............................. 2002-151993

(51) Int. Cl.
*H04N 5/225*    (2006.01)
*H04N 5/76*    (2006.01)

(52) U.S. Cl. .............................. 348/220.1; 348/231.99
(58) Field of Classification Search ...................... None
See application file for complete search history.

(56) References Cited

U.S. PATENT DOCUMENTS

| 5,043,816 | A | 8/1991 | Nakano et al. |
| 5,525,957 | A * | 6/1996 | Tanaka ..................... 348/220.1 |
| 6,343,146 | B1 * | 1/2002 | Tsuruoka et al. ............. 382/163 |
| 7,027,087 | B2 * | 4/2006 | Nozaki et al. ........... 348/231.99 |
| 7,039,250 | B2 | 5/2006 | Kuroiwa |
| 7,088,865 | B2 | 8/2006 | Ejima et al. |

FOREIGN PATENT DOCUMENTS

| JP | A 11-136557 | 5/1999 |
| JP | A 2001-223979 | 8/2001 |
| JP | A 2001-320621 | 11/2001 |

* cited by examiner

*Primary Examiner*—James M Hannett
(74) *Attorney, Agent, or Firm*—Oliff & Berridge, PLC

(57) ABSTRACT

An electronic camera includes an imaging unit for continuously capturing images of a subject to create a plurality of frames of RAW data, an evaluation unit for evaluating quality of the RAW data, and a recording unit for selecting a highly evaluated frame from the RAW data according to a result of the quality evaluation by the evaluation unit, and storing the selected frame of RAW data.

10 Claims, 3 Drawing Sheets

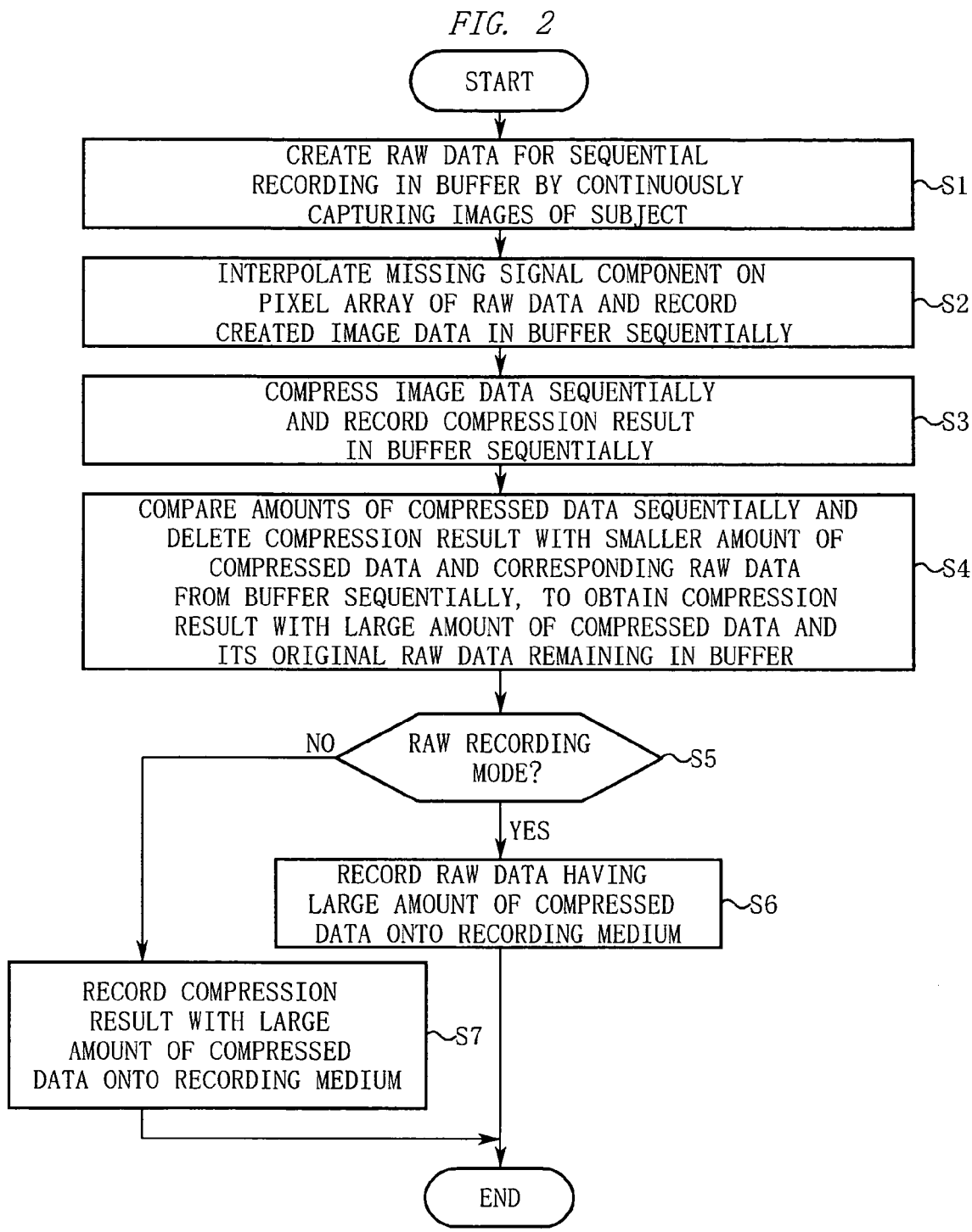

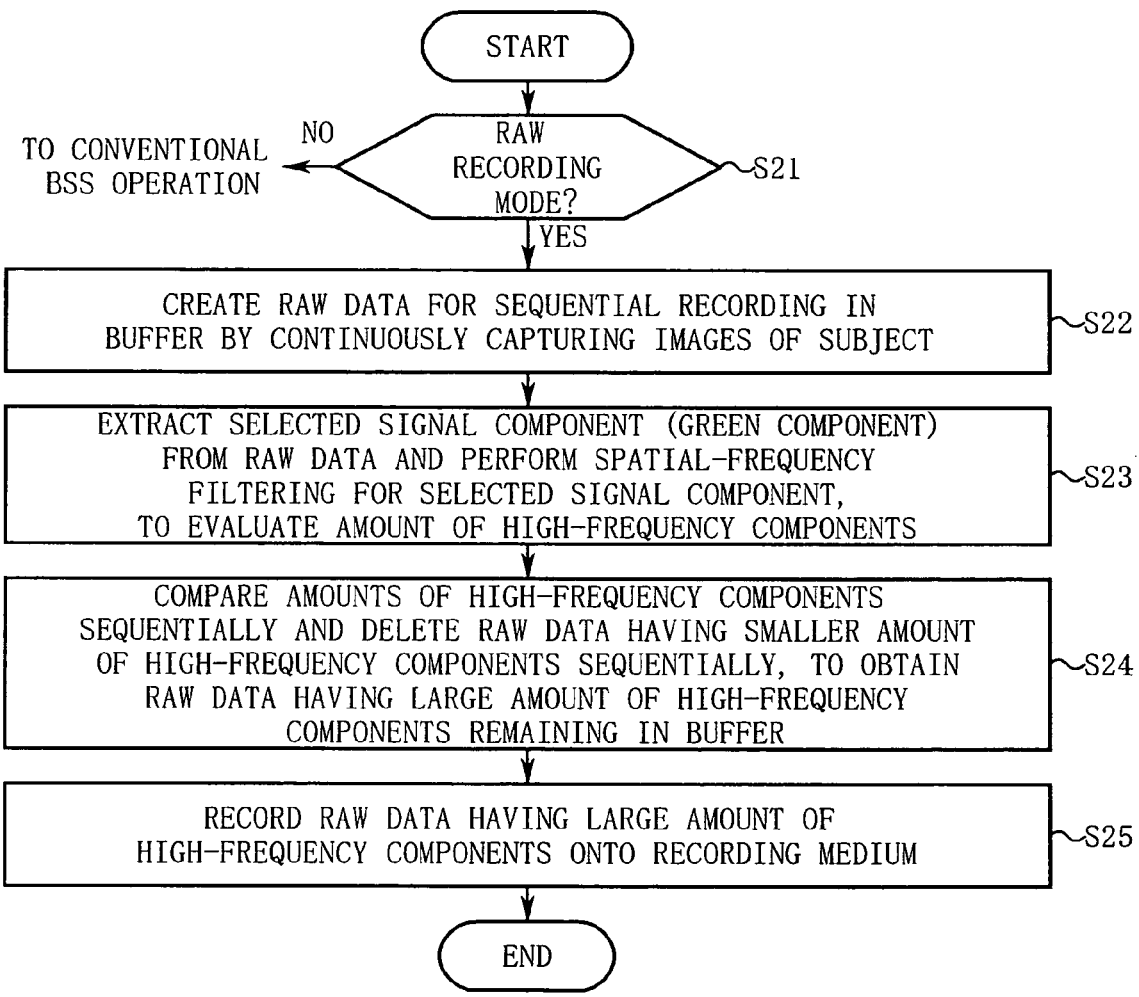

ELECTRONIC CAMERA AND IMAGE PROCESSING PROGRAM

TECHNICAL FIELD

The present invention relates to an electronic camera which selects from continuously captured images an image captured in good condition for storage.

The present invention also relates to an image processing program for causing a computer to select an image captured in good condition from images continuously captured by an electronic camera or the like.

TECHNOLOGICAL BACKGROUND

There is a conventionally known electronic camera that carries out a BSS (Best Captured Selector) operation. The BSS operation is an operation to select an image that was captured in good condition from a group of continuously captured images and stores the selected image (see Japanese Patent Unexamined Application Publication No. Hei 11-136557, for example).

On the other hand, there is another known electronic camera that stores therein RAW data (see Japanese Patent Unexamined Application Publication No. 2001-223979, for example). RAW data is subjected to almost no image processing, so that it is faithful to a raw output signal of an image sensor and contains abundant information on an image at a time when the image has been captured. Moreover, the RAW data generally is large in quantifying bit number and is also a signal containing abundant gradation of the image.

For example, the RAW data mostly has 12-bit gradation in each color while general-purpose image data has 8-bit gradation in each color.

From the above features, the RAW data is suitable for complex or sophisticated image processing.

The conventional electronic camera selects image data containing a large amount of information on an image according to the file size of a JPEG compressed file.

For recording the aforementioned RAW data, however, the recording route or procedure therefor is greatly different from that for typical image data, so that no JPEG compressed file is created.

For this reason, no conventional electronic camera has the BSS operation for RAW data.

DISCLOSURE OF THE INVENTION

It is therefore an object of the present invention to realize a BSS operation suitable for RAW data.

The present invention will be described below.

(1) An electronic camera of the present invention includes an imaging unit, an evaluation unit, and a recording unit.

The imaging unit continuously captures an image of a subject to generate a plurality of frames of RAW data. The evaluation unit evaluates quality of the RAW data.

The recording unit selects a highly evaluated frame for storage from the frames of RAW data according to the result of the quality evaluation by the evaluation unit.

(2) It is preferable that the evaluation unit evaluate quality of image data that is generated by interpolating a missing-signal component of the RAW data.

In general, in the case where the RAW data in each pixel does not contain all signal components, a result of the quality evaluation may be inaccurate. However, performing the quality evaluation after the interpolation of the missing-signal component as described above makes it is possible to evaluate the quality of the RAW data more accurately.

(3) Moreover, it is preferable that the evaluation unit evaluate quality of the RAW data according to a spatial frequency component of the image data whose missing-signal component has been interpolated.

Interpolating the missing-signal component as described above can increase the number of samples of signal components (sample density), which allows precise detection of the spatial frequency components. Accordingly, it is possible to evaluate quality of the RAW data more accurately.

(4) It is preferable that the evaluation unit extract a predetermined signal component (hereinafter, referred to as selected signal component) from signal components arranged on a pixel array of the RAW data to evaluate quality of the RAW data according to the selected signal component.

More preferably, the evaluation unit sets a signal component having the smallest amount of the missing-signal component (e.g., a green component in a primary color Bayer pattern) as the selected signal component.

The quality evaluation according to only the selected signal component enables accurate quality evaluation even without the interpolation of the missing-signal component. In this case, it is possible to simplify the procedure of the quality evaluation for the RAW data and perform the BSS operation for the RAW data at high speed.

(5) Moreover, it is preferable that the evaluation unit determine a signal component containing brightness information more than other signals as the selected signal component to evaluate quality of the RAW data according to a spatial frequency component of the selected signal component.

Since the selected signal component contains brightness information most, it has a higher visual sensitivity than the other signal components particularly. Thus, it is possible to properly select good RAW data in terms of visual evaluation (e.g., RAW data with visual high sharpness, containing less blurring caused by hand movement).

(6) An image processing program of the present invention is for causing a computer to process a plurality of pieces of RAW data continuously captured by an imaging unit. The characteristics of this image processing program is to cause the computer to function as the evaluation unit and the recording unit as recited in any one of claims 1 to 5.

Executing this image processing program makes it possible to select and store good RAW data by use of the computer.

BRIEF DESCRIPTION OF THE DRAWINGS

The above-mentioned objects and other objects of the invention will become easily apparent from the following detailed description when read in conjunction with the accompanying drawing:

FIG. 2 is a flowchart showing an operation of the electronic camera 11 according to a first embodiment of the present invention; and FIG. 3 is a flowchart showing an operation of the electronic camera 11 according to a second embodiment of the present invention.

BEST MODE FOR CARRYING OUT THE INVENTION

Figure 1:
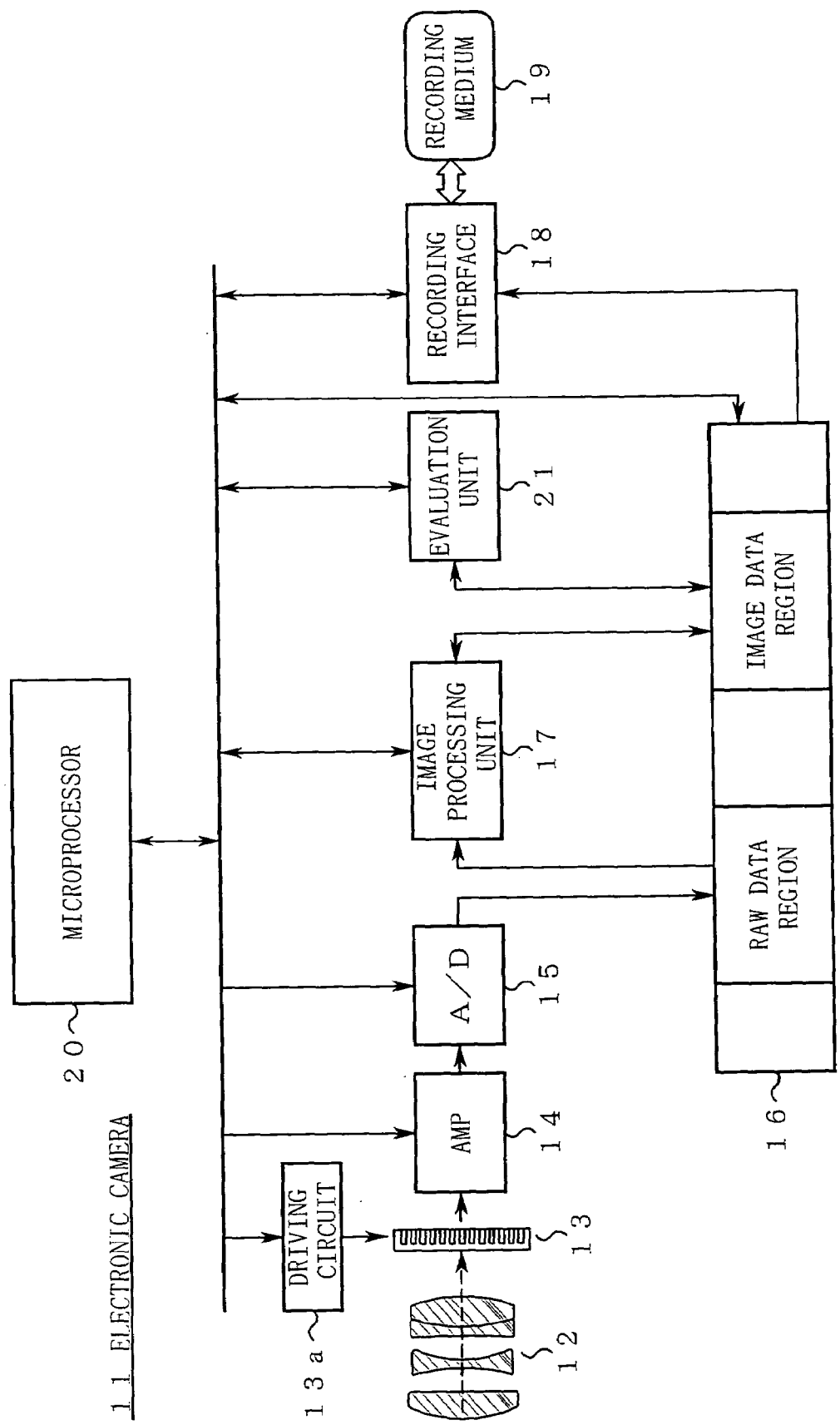
FIG. 1 is a block diagram showing the structure of an electronic camera 11.

Hereinafter, embodiments of the present invention will be described with reference to the accompanying drawings.

Embodiment 1

FIG. 1 is a block diagram showing the structure of an electronic camera 11 according to the present embodiment.

In FIG. 1, a lens 12 is mounted to the electronic camera 11. In an image space of the lens 12, a light-receiving plane of an image sensor 13 is arranged. The image sensor 13 is driven by a driving pulse from a driving circuit 13a and outputs analog RAW data.

The RAW data is input to an A/D converter 15 via an amplifier 14. The A/D converter 15 converts the RAW data into digital data pixel-by-pixel, thereby obtaining digital RAW data.

The thus obtained RAW data is temporarily recorded in a buffer 16. Then, an image processing unit 17 accesses the buffer 16 and performs color interpolation, image compression, or other image processings.

The processing results obtained by the image processing unit 17 is recorded for storage via a recording interface 18 onto a detachable recording medium 19.

The electronic camera 11 is provided with a microprocessor 20 for controlling the entire system, and an evaluation unit 21. The microprocessor 20 controls respective operations of the aforementioned signal processing system. The evaluation unit 21 extracts an evaluation parameter from data on which the image processings have been performed, for example, to evaluate quality of an image.

Relation Between the Embodiment and the Invention

In the following the relation between this embodiment and the invention will be described. It should be noted that the relation is described as a way of example for reference and does not limit the scope of the invention.

The imaging unit recited in the claims corresponds to the image sensor 13, the driving circuit 13a, and the A/D converter 15.

The evaluation unit recited in the claims corresponds to the evaluation unit 21 and the image processing unit 17.

The recording unit corresponds to the image processing unit 17, the recording interface 18, and the microprocessor 20.

Description on Operations in Embodiment 1

FIG. 2 is a flowchart for explaining the operation of the electronic camera 11 in the first embodiment. Hereinafter, the operation will be described with reference to step numbers shown in FIG. 2.

Step S1: The microprocessor 20 continuously drives the image sensor 13 using the driving circuit 13a, to capture continuous images of a subject.

By such an imaging operation, the image sensor 13 outputs a plurality of frames of RAW data sequentially. The frames of RAW data are digitalized by the A/D converter 15 and then recorded in a RAW data region of the buffer 16 temporarily.

Step S2: The microprocessor 20 instructs the image processing unit 17 to perform a color interpolation processing on the RAW data. The image processing unit 17 accesses the RAW data region and performs color interpolation on missing-signal components on the pixel array of the RAW data in sequence.

Image data is thus created by the color interpolation and temporarily recorded in an image data region of the buffer 16.

Step S3: The microprocessor 20 instructs the image processing unit 17 to compress the image data. The image processing unit 17 accesses the image data region and compresses the image data sequentially. The result of compressing the image data (compressed data) is temporarily recorded in the image data region of the buffer 16.

Step S4: The microprocessor 20 instructs the evaluation unit 21 to perform quality evaluation. The evaluation unit 21 accesses the image data region and compares the amounts of compressed data for respective compression results of the RAW data. The microprocessor 20 then deletes the compression result with a smaller amount of compressed data and its original RAW data from the buffer 16 according to the comparison result by the evaluation unit 21.

By the above operation, the compression result with a large amount of compressed data and its original RAW data remain till the end in the buffer 16. The remaining image data in the buffer 16 is likely to contain more information on the image and provides a sharp image because it has the large amount of compressed data.

Step S5: The microprocessor 20 determines whether or not the electronic camera 11 is set to a RAW recording mode.

When the electronic camera 11 is set to the RAW recording mode, the microprocessor 20 advances the operation to Step S6.

On the other hand, when the electronic camera 11 is not set to the RAW recording mode, the microprocessor 20 advances the operation to Step S7.

Step S6: The microprocessor 20 instructs the recording interface 18 to record the RAW data. The recording interface 18 selects from the RAW data recorded in the buffer 16 in Step S1 the RAW data that remains till the end in the buffer 16 (having the large amount of compressed data), stores it as a file in the recording medium 19 in the form of uncompressed data.

A BSS operation for RAW data is completed through a series of operations described above.

Step S7: The microprocessor 20 instructs the recording interface 18 to record the compressed image data. The recording interface 18 selects the compression result of image data remaining till the end in the buffer 16 (i.e., the compression result with the large amount of compressed data) from the compression results of image data compressed and recorded in the buffer 16 in Step S3, and stores it as a file in the recording medium 19.

A BSS operation for compressed image data is completed through a series of operations described above.

Effects of Embodiment 1

As described above, according to the first embodiment, image data is created by interpolating a missing-signal component of RAW data. Then, the quality of the image data is evaluated. Thus, it is less likely that the missing-signal component of the RAW data decreases the accuracy of the results of the quality evaluation, which improves quality evaluation accuracy.

Moreover, the above image data is close to a final image that is obtainable by processing the RAW data in exterior, for example, on a computer. Thus, the quality evaluation is particularly preferable in view of selecting RAW data from which a good final image can be created.

Furthermore, according to the first embodiment, the number of pixels (the number of samples of the image) appears to be increased by interpolation, so that aliasing and a false color component can be suppressed. Thus, it is possible to improve a situation where the aliasing and false color component makes evaluation of the spatial frequency components incorrect.

Next, another embodiment of the present invention will be described.

Embodiment 2

The structure of the second embodiment, and relation between the embodiment and the invention are the same as those described in the first embodiment, therefore description thereof will be omitted here. In addition, from that reason, the same reference numerals shown in FIG. 1 are also used in the following description.

Description on Operations in Embodiment 2

FIG. 3 is a flowchart showing the operation of the electronic camera 11 in the second embodiment. Hereinafter, the operation will be described with reference to the step numbers shown in FIG. 3.

Step S21: The microprocessor 20 determines whether or not the electronic camera 11 is set to the RAW recording mode.

When the electronic camera 11 is set to the RAW recording mode, the microprocessor 20 advances the operation to Step S22.

On the other hand, when the electronic camera 11 is not set to the RAW recording mode, the microprocessor 20 advances the operation to a known BSS operation.

Step S22: The microprocessor 20 continuously drives the image sensor 13 using the driving circuit 13a, thereby capturing continuous images of a subject.

RAW data output from the image sensor 13 is converted by the A/D converter 15 into digital data, and thereafter the digital data is temporarily recorded in the RAW data region of the buffer 16 sequentially.

Step S23: The microprocessor 20 instructs the image processing unit 17 to extract a selected signal component (a green component in this example). The image processing unit 17 accesses the RAW data region and extracts the green component from the RAW data. The extracted green component is temporarily stored in the image data region of the buffer 16. For example, in case of RAW data in Bayer pattern, the green component in a checkered pattern is extracted.

Then, the microprocessor 20 instructs the evaluation unit 21 to evaluate quality of the green component. The evaluation unit 21 performs local multiplicative summation (i.e., so-called spatial-frequency filtering) to the green component to obtain a difference between adjacent pixels. Note that the local multiplicative summation does not include a calculation for a missing part of the green component.

In this manner, only high-frequency components (an edge portion or a region where gradation largely changes) are extracted from the green component to create an image. The evaluation unit 21 sums absolute values of these high-frequency components within a predetermined region (e.g., the entire image plane, the central region of the image plane, or a selected focus detection area), to obtain the amount of the high-frequency components.

Step S24: The evaluation unit 21 compares the thus obtained amounts of the high-frequency components sequentially. According to the comparison result, the microprocessor 20 deletes RAW data having a smaller amount of the high-frequency components from the buffer 16 one by one.

Through the above operation, RAW data having the large amount of the high-frequency components remains till the end in the buffer 16. The remaining RAW data is very likely to contain details of an image in abundance and provides a sharp image because of the large amount of high-frequency components.

Step S25: The microprocessor 20 instructs the image processing unit 17 to compress the RAW data. The image processing unit 17 compresses the RAW data remaining till the end in the buffer 16 (the RAW data having the large amount of the high-frequency components of the green component).

The recording interface 18 stores the RAW data in the recording medium 19 as a file.

Through a series of operations described above the BSS operation for the RAW data is completed.

Effects of Embodiment 2

As described above, in the second embodiment, the green component that contains brightness information most is extracted from signal components on the pixel array of the RAW data to evaluate the amount of the high-frequency components for the extracted green component.

As compared with the first embodiment, the color interpolation processing on the RAW data is not required in this case. Moreover, it is possible to simplify the procedure of the quality evaluation because the quality evaluation is needed only for the green component. Consequently, it is easy to substantially increase the speed of the BSS operation for the RAW data according to the second embodiment.

In addition, the green component has higher visual sensitivity than other color components, i.e., a red component and a blue component. Thus, by performing the quality evaluation using the spatial frequency components of the green component as a reference, it is possible to accurately select RAW data that provides a visually sharp image.

Supplemental Items of Embodiments

The aforementioned embodiments have described the electronic camera 11. However, the present invention is not limited thereto. For example, an image processing program may be created by program-coding the operational processings related to the BSS operation of the present embodiments.

Moreover, in the aforementioned embodiment, the selected RAW data is recorded in the form of uncompressed data. However, the present invention is not limited thereto. For example, the RAW data may be subjected to lossless compression or lossy compression for recording. The RAW data may be subjected to information amount reduction, trimming, or 90-degree rotation for recording, for example.

In addition, in the aforementioned embodiment the shooting condition is evaluated according to the spatial frequency components. However, the present invention is not limited thereto and it can use any evaluation method as long as the shooting condition can be evaluated by the method.

For example, an acceleration sensor may be mounted to the electronic camera so as to measure the amount of hand movement. In this case, RAW data captured with a small amount of hand movement may be evaluated as RAW data captured in good shooting condition.

Moreover, for example, RAW data in abundant gradation may be evaluated as the RAW data captured in good shooting condition according to gradation (e.g., gradation histogram) of RAW data (or image data created from the RAW data).

Moreover, for example, RAW data in vivid colors may be evaluated as the RAW data captured in good shooting condition according to color saturation of RAW data (or image data created from the RAW data).

Moreover, for example, RAW data with a hue that is close to a memory color may be evaluated as the RAW data captured in good shooting condition according to hue of a specific color (e.g., a color of skin or a color of a blue sky) of RAW data (or image data created from the RAW data).

Moreover, for example, according to hue of RAW data (or image data created from the RAW data), RAW data with many different hues may be evaluated as the RAW data captured in good shooting condition.

Moreover, for example, according to a noise in RAW data (or image data created from the RAW data), RAW data with a less noise may be evaluated as the RAW data captured in good shooting condition.

Moreover, for example, RAW data containing edge components mostly in a horizontal direction or a vertical direction may be evaluated as good RAW data captured while the electronic camera is in less inclination, according to a degree of inclination of an edge component contained in RAW data (or image data created from the RAW data) within an image plane.

In the first embodiment described above, image data for quality evaluation is created by using a full-fledged color interpolation processing for image recording. However, the present invention is not limited thereto. For example, the image data for the quality evaluation may be created by using another interpolation processing that is different from the full-fledged color interpolation processing (for example, simple linear interpolation). In this case, it is possible to simplify the interpolation processing, thereby further heightening the speed of the BSS operation for the RAW data.

Moreover, in this another interpolation processing it is preferable to prevent the quantifying bit number of the RAW data from decreasing. In this case, more precise RAW data quality evaluation is enabled by additionally evaluating a minute difference in gradation or color tone.

The above-described second embodiment employs the green component as the selected signal component. However, the selected signal component of the present invention is not limited to the green component. In general, the selected signal component is preferably a signal component containing brightness information most among signal components constituting RAW data.

The invention can be put into practice in various forms without departing from its spirit or its major aspects. Thus, the aforementioned embodiments merely exemplify the present invention at all points and should not be interpreted exclusively. The scope of the invention is described by the appended claims but is not bounded by the specification. Moreover, all changes and modifications within a range that is equivalent to the claims fall within the scope of the invention.

INDUSTRIAL AVAILABILITY

An electronic camera of the present invention captures continuous images of a subject, to create a plurality of frames of RAW data. The electronic camera evaluates shooting conditions for the frames of RAW data, and selects for storage a highly evaluated frame from these frames of RAW data.

Through such an operation, it is possible to obtain RAW data captured in good shooting condition with a high probability even if shooting is made under a difficult situation.

What is claimed is:

1. An electronic camera comprising:
an imaging unit continuously capturing an image of a subject to generate a plurality of frames of RAW data;
a buffer unit temporarily recording the plurality of frames of RAW data generated by the image unit;
an evaluation unit evaluating quality of the plurality of frames of RAW data recorded in the buffer unit by comparing information regarding the plurality of frames of RAW data and selecting a highly evaluated frame of RAW data from the plurality of frames of RAW data according to a result of the quality evaluation; and
a recording unit recording the highly evaluated frame of RAW data selected by the evaluation unit into a recording medium.

2. The electronic camera according to claim 1, wherein the evaluation unit evaluates quality of image data that is generated by interpolating a missing-signal component of the RAW data.

3. The electronic camera according to claim 2, wherein the evaluation unit evaluates quality of the RAW data according to a spatial frequency component of the image data.

4. The electronic camera according to claim 1, wherein the evaluation unit extracts a predetermined signal component (hereinafter, referred to as selected signal component) from signal components to evaluate quality of the RAW data according to the selected signal component, the signal components arranged on a pixel array of the RAW data.

5. The electronic camera according to claim 4, wherein the evaluation unit determines a signal component containing brightness information more than other signals as the selected signal component to evaluate quality of the RAW data according to a spatial frequency component of the selected signal component.

6. A computer-readable storage medium storing an image processing program for causing a computer to process a plurality of pieces of RAW data continuously captured by an imaging unit, wherein
the program causes the computer to function as the evaluation unit and the recording unit as recited in claim 1.

7. A computer-readable storage medium storing an image processing program for causing a computer to process a plurality of pieces of RAW data continuously captured by an imaging unit, wherein
the program causes the computer to function as the evaluation unit and the recording unit as recited in claim 2.

8. A computer-readable storage medium storing an image processing program for causing a computer to process a plurality of pieces of RAW data continuously captured by an imaging unit, wherein
the program causes the computer to function as the evaluation unit and the recording unit as recited in claim 3.

9. A computer-readable storage medium storing an image processing program for causing a computer to process a plurality of pieces of RAW data continuously captured by an imaging unit, wherein
the program causes the computer to function as the evaluation unit and the recording unit as recited in claim 4.

10. A computer-readable storage medium storing an image processing program for causing a computer to process a plurality of pieces of RAW data continuously captured by an imaging unit, wherein
the program causes the computer to function as the evaluation unit and the recording unit as recited in claim 5.

* * * * *